H. E. RICHMOND.
LENS MOUNT.
APPLICATION FILED MAR. 1, 1909.
959,387.
Patented May 24, 1910.
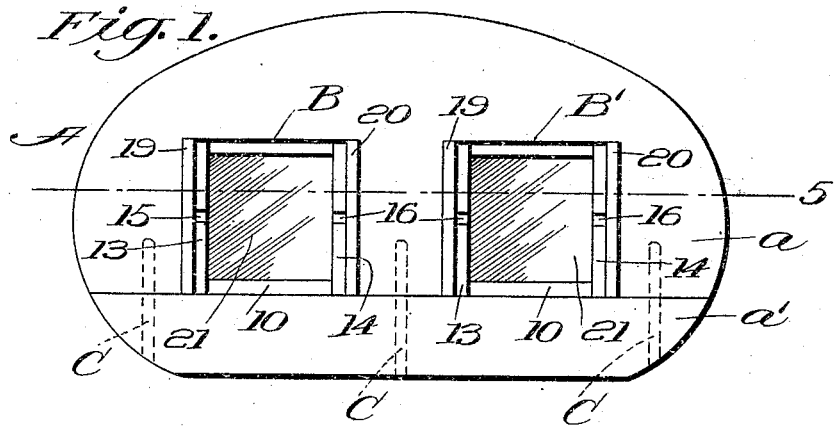
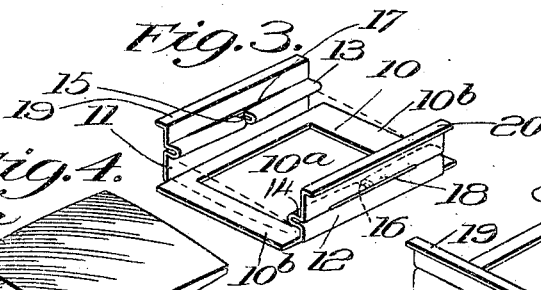
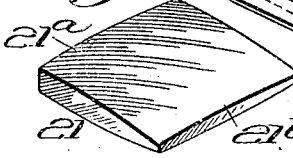
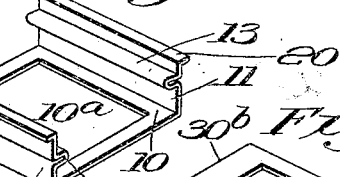
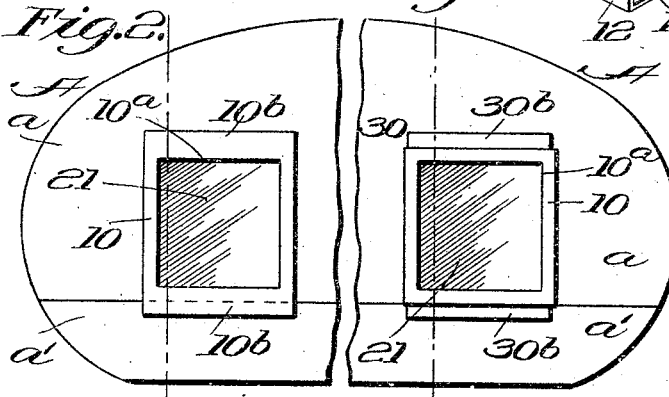
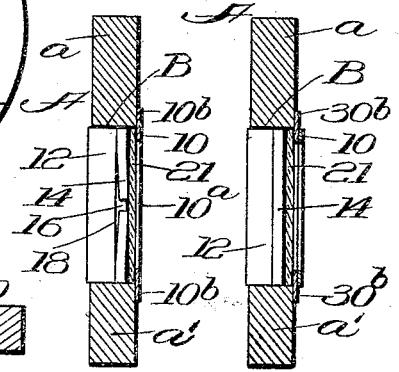
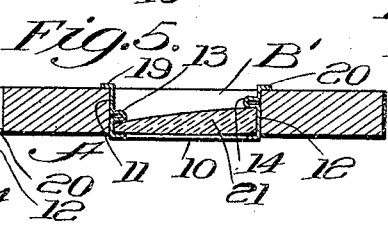
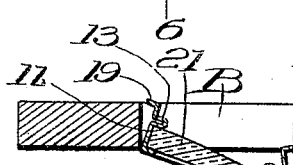

UNITED STATES PATENT OFFICE.

HENRY E. RICHMOND, OF WESTWOOD, NEW JERSEY.

LENS-MOUNT.

959,387.   Specification of Letters Patent.   Patented May 24, 1910.

Application filed March 1, 1909. Serial No. 480,695.

*To all whom it may concern:*

Be it known that I, HENRY E. RICHMOND, a citizen of the United States, and a resident of Westwood, county of Bergen, and State of New Jersey, have invented certain new and useful Improvements in Lens-Mounts, of which the following is a specification.

My invention relates to certain novel features in the construction of lens mounts and especially those for use in stereoscopes.

One of the objects of my invention is to produce a simple mount which can be cheaply constructed and in which the lens may be quickly and securely fastened in place and the device taken apart in order to change or remove the lens when desired.

Other objects will appear from the hereinafter description.

The invention is fully illustrated in the accompanying drawings forming part of this application, in which the same reference character indicates the same part in the several views.

Referring to the drawings: Figure 1 is a front view of the lens frame showing the lens mount secured in place therein. Fig. 2 is a rear view of one half of said frame showing one of the lens mounts in place. Fig. 3 is a perspective view of the lens mount. Fig. 4 is a perspective view of the lens to be used in said mount. Fig. 5 is a horizontal section on line 5 of Fig. 1. Fig. 6 is a vertical section on line 6 of Fig. 2. Fig. 7 is a perspective view of one element of a modified construction of lens mount. Fig. 8 is a perspective view of another element of this mount. Fig. 9 is a rear view of one half of a lens frame showing this modified mount in place therein. Fig. 10 is a section on line 10 of Fig. 9.

Referring now to the drawing, the part marked A is the lens frame having two openings B, B' for the lens mount. This lens frame is made in two sections $a$, $a'$, the two sections being connected by the dial pins C. In constructing this frame a number of these sections $a$ are placed on a proper working support of a machine and the openings B and B' are cut out at one operation. Then the piece $a'$ is connected to the piece $a$ by the dial pins C.

The preferable form of lens mount is shown in Fig. 3 of the drawing, and it is preferably stamped out of a single piece of metal and it consists of the rear plate 10, having an opening $10^a$ therein, and two sides 11 and 12. The length of said sides is less than the length of the rear plate 10 so that there will be a flange $10^b$ projecting beyond the edges of the sides. Each of these sides has an inwardly projecting flange 13 and 14 formed by turning the material back upon itself. Each of these flanges is cut away at 15 and 16 and they are also partly separated from the sides by the slots 17 and 18, and they are pressed toward the rear plate 10, as shown, to form resilient clamps to hold the lens in place. The ends of the sides 11 and 12 are outturned to form the flanges 19 and 20.

21 is the lens to be used in said mount. This lens is thicker at one end $21^a$ than at the other $21^b$.

The flanges 13 and 14 are so located on the sides 11 and 12 of the mount that the lens can be readily forced under the side flanges 13 and 14 and be held in place thereby. After the lens is in place in the mount the mount can be readily inserted in the openings B and B' in the lens frame. The manner of insertion is shown in Fig. 5 of the drawing, in which the side of the lens frame in which the thicker edge of the glass is mounted is first inserted in the opening B, as shown in Fig. 5; then the other side 12 is inserted and the whole mount is then pressed to the rear where it will snap into position. The flanges $10^b$ will rest against the rear of the frame, as shown in Fig. 2, and prevent the mount from being pressed entirely through the openings. The outturned flanges 19 and 20 bearing against the rear of the frame will hold the mount securely in place. To the right of Fig. 5 the lens mount is shown in position in the opening B'.

The modified construction will now be described. It consists of a rear plate 10 having an opening $10^a$ therein and two sides 11 and 12, and the inturned flanges 13 and 14. The free ends of the sides 11 and 12 are also outturned to form the flanges 19 and 20. In this construction the inturned flanges 13 and 14 are not cut away and are not severed from the side plates 11 and 12, as in the other construction. I also provide in this form a separate plate 30 having an opening $30^a$ therein of the same shape and size as $10^a$, and two end pieces $30^b$ corresponding to the flanges $10^b$ in the prior described construction.

In assembling this mount the plate 30 is placed against the plate 10 and between the sides 11 and 12 with the opening 30ª registering with the opening 10ª, and the two end pieces 30ᵇ projecting beyond the edges of the sides 11 and 12. The lens 21 is now inserted in place and it is held securely by the side flanges 13 and 14. The mount is now inserted in the openings B and B' in the same manner as heretofore described. The ends 30ᵇ will rest against the rear of the lens frame, as shown in Figs. 9 and 10, and together with the flanges 19 and 20 will hold the lens mount in place in the lens opening.

Having now described my invention, what I claim as new and desire to secure by Letters Patent is:

1. In a lens mount, a plate having an opening therein, two sides connected with said plate, an inturned flange on each side, and an outturned flange at the ends of said sides.

2. A lens holder consisting of a plate having an opening therein, sides on said plate, flanges on said plate extending beyond the sides, inturned flanges formed on the sides, and outturned flanges at the ends of the sides.

3. A lens holder consisting of a plate having an opening therein, two sides of less length than the length of the said plate, inturned flanges provided on each of said sides, each flange being partly cut away and also partly separated from the side and bent toward the plate, the free end of each side having an outturned flange.

4. In a stereoscope, a lens frame having openings therein, a lens mount in each of said openings, said mount consisting of a plate having an opening therein, sides of less length than the length of the plate to leave flanges on the plate, each of the sides being bent to form inwardly projecting flanges, each of said flanges being partly cut away and also partly separated from the side and bent toward the plate, and an outturned flange on each of said sides, a lens in said mount and held in position by the inturned flanges, the mount being held in the opening in the lens frame by the flanges on the plate and the flanges on the sides.

In witness whereof I have hereunto set my hand at New York, county of New York and State of New York this ninth day of February, 1909.

HENRY E. RICHMOND.

In presence of—
E. W. ULMAN,
JOHN J. RANAGAN.